F. E. ROSS.
SCREW THREAD CUTTING TOOL.
APPLICATION FILED MAR. 11, 1908.
915,383.
Patented Mar. 16, 1909.
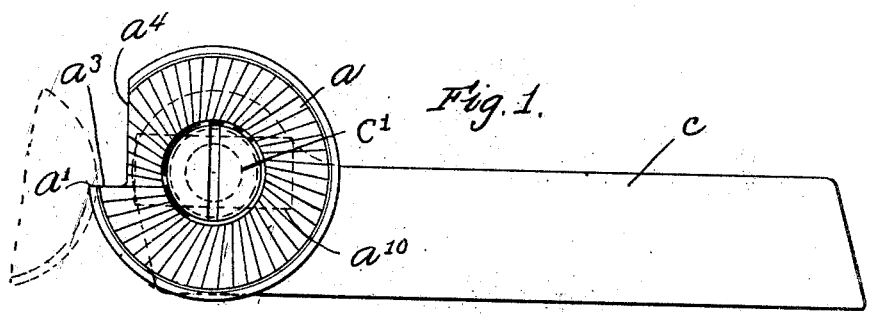
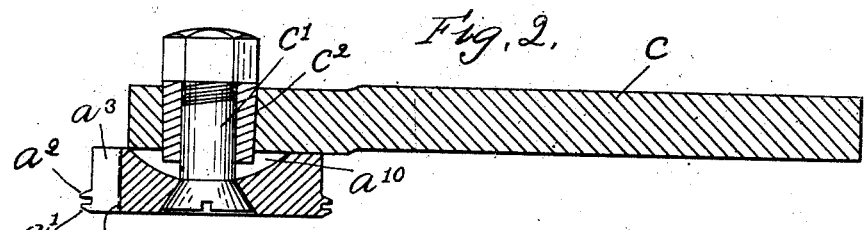
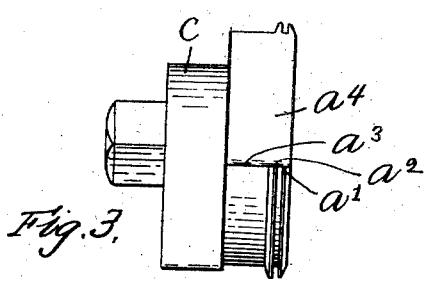
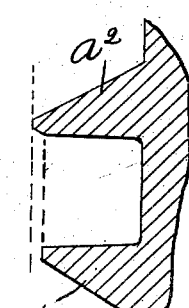
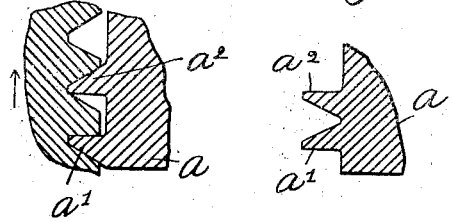
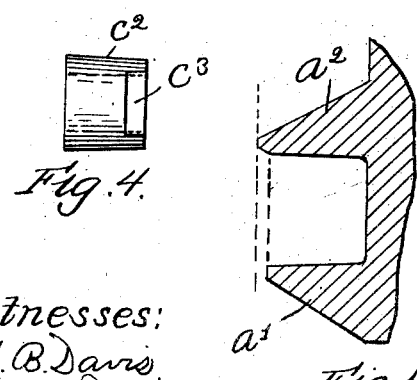
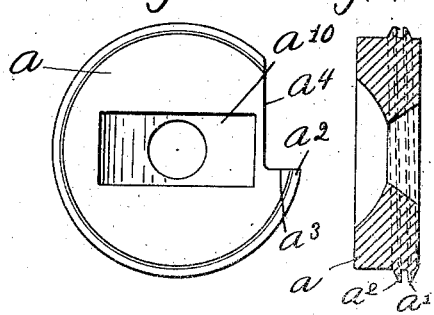
Witnesses:
H. B. Davis
Cynthia Doyle
Inventor:
Frank E. Ross

UNITED STATES PATENT OFFICE.

FRANK E. ROSS, OF CAMBRIDGE, MASSACHUSETTS.

SCREW-THREAD-CUTTING TOOL.

Specification of Letters Patent.    Patented March 16, 1909.

Application filed March 11, 1908. Serial No. 420,315.

*To all whom it may concern:*

Be it known that I, FRANK E. Ross, of Cambridge, county of Middlesex, State of Massachusetts, have invented an Improvement in Screw-Thread-Cutting Tools, of which the following is a specification.

This invention relates to screw-thread cutting-tools for cutting external or internal screw-threads, and has for its object to construct a tool for simultaneously cutting one angle of one thread and the opposite angle of another thread, or it may be the opposite angle of the same thread, so that as the tool travels along and the work revolves, both angles of the threads will be cut. Usually the thread-cutting tool travels over the work several times before the threads are finished, and during each excursion the cutting of the threads will be partially performed until finally, when the cutting-tool has sunken deep enough into the work, the threads will be formed and finished.

In the preferred form of my invention the thread-cutting ribs are arranged perimetrically on a notched disk, in planes at right angles to the axis of the disk, and the end of the tool-holder bearing said disk is offset so that said disk is supported in a plane corresponding to the angle of the thread with relation to the axis of the bar on which the thread is formed.

The invention also has for its object to provide improved means for rigidly securing the disk bearing the thread-cutting ribs to its holder.

Figure 1 is a side elevation of a screw-thread cutting-tool embodying this invention. Fig. 2 is a horizontal section of the same taken on the dotted line 2—2 Fig. 1. Fig. 3 is an end view of the tool. Fig. 4 is a side elevation of the bushing which is employed in securing the disk to its holder. Fig. 5 is an enlarged detail showing my preferred form of angularly-formed thread-cutting ribs. Fig. 6 is a rear side elevation of the disk. Fig. 7 is a sectional detail of a portion of the tool in engagement with the work. Fig. 8 is a sectional detail of a modified form of tool to be described, and Fig. 9 is another modified form of tool to be described.

$a$ represents a circular disk having on its perimeter two or more angularly formed thread-cutting ribs, two only as $a'$ and $a^2$, being herein shown merely for the purpose of illustration. These ribs are arranged side by side in parallelism, and are suitably spaced apart. The disk is notched on its edge, one wall of said notch, as at $a^3$, extending from the edge inward toward the center approximately radially and the other wall, as $a^4$, extending from the bottom of the aforesaid wall to the edge on a chord of the arc of the disk. The disk is adapted to be rigidly secured to a holder by means to be hereinafter described. The angles of the outer sides of the angularly formed thread-cutting ribs $a'$, $a^2$, correspond to the angles of the opposite sides or corresponding sides of the threads to be cut, and the angles of the inner sides thereof are formed at approximately right angles to the axis of the disk, or of the work, as represented in Fig. 7; but in lieu thereof the angles of the inner sides of said ribs may be formed at angles corresponding to the angles of the opposite sides or corresponding sides of the threads to be cut and the angles of the outer sides thereof may be formed at approximately right angles to the axis of the disk, or of the work, as shown in Fig. 8. The two ribs thus formed are oppositely disposed, and will respectively act upon and cut the opposite sides of the threads and during the cutting operation spaces will be provided between the unacted-upon sides of the threads and the ribs for clearance. The ribs are spaced apart to act upon two separate threads, as for instance, in the form shown in Fig. 7, which is the preferred form of my invention, the angularly formed ribs will act upon or engage two threads which are located at opposite sides of a disengaged thread, or in other words will act upon the alternately arranged threads, while in the form shown in Fig. 8, the angularly formed ribs while oppositely disposed will act upon or engage the opposite sides of the same thread. The angularly formed ribs act simultaneously, yet each performs its own operation of cutting one side of the thread, so that while one thread is being cut upon one side, another thread or it may be the same thread is being cut upon the opposite side.

By the employment of two thread-cutting ribs, arranged side by side so as to act simultaneously, each having a single cutting face, there is no wedging action produced as the threads enter the work, ample clearance is provided for the chips, the cutting tool can be fed in straight toward the work, using a simple cross slide; and the usual end thrust on the work and the usual side thrust on the tool is equalized.

I prefer to make one of the angularly formed thread-cutting ribs longer than the other, as best shown in Fig. 5, wherein the rib $a^2$ is made longer than the rib $a'$, and in such case the rib $a'$ acts upon the work in advance of the rib $a^2$; also, as shown in said figure the end of the rib $a'$ is flattened and the end of the rib $a^2$ is flattened and also beveled for a short distance on its straight side. By thus forming the ends of the ribs, spaces are formed between the threads on the work, but my invention is not limited to any particular form which may be given to the ends of the ribs, as such formation will vary according to the work which is to be done.

Ordinarily in cutting a thread the tool is moved longitudinally with respect to the work and the work is revolved with respect to the tool, and when cutting the thread by my process the tool and work will be moved in the usual manner. In cutting the thread the tool usually passes over the work several times, each time the angularly-formed thread-cutting ribs sinking deeper into the work, and it will be observed that on the straight sides of the ribs ample space is always provided for clearance.

In the preferred form of my invention the thread-cutting ribs are arranged on the perimeter of the disk in planes at right angles to the axis of the disk, as shown in Figs. 2 and 3, but in lieu thereof they may be arranged thereon spirally, as shown in Fig. 9. When arranged in planes at right angles to the axis of the disk the end of the tool-holder $c$ is offset at a slight angle with respect to its shank, as shown in Figs. 2 and 3, so that the disk is supported out of a true vertical plane and at an angle corresponding to the angle of the thread with respect to the axis of the bar on which it is formed.

As a means for rigidly securing the disk $a$ to its holder $c$ said disk is provided with a center-hole to receive a bolt $c'$ which extends through a tapered bushing $c^2$, which is placed in a hole in the holder $c$, and projects from the holder at both sides. The nut on the bolt is turned down tightly against the outer projecting end of said bushing. The opposite or inner projecting end of the bushing is formed with parallel sides, as represented at $c^3$, Fig. 4, and the rear face or side of the disk $a$ is formed with a recess $a^{10}$ having parallel sides, to receive the parallel sided end of the bushing, which latter is made to snugly fit it. The inner projecting end of the bushing serves as a key to engage and hold the disk from rotation and as the disk is ground away and thereby caused to occupy different relative positions to its holder, the said inner projecting end of the bushing may always properly enter the recess in the disk by reason of said bushing being permitted to turn in the hole in the holder when loosened by loosening the nut on the bolt. The bushing therefore serves as an adjustable key for engaging the disk, being adapted to occupy any number of positions according to the requirements of the case, and in any position whatsoever that it may be set it may be rigidly secured to the holder. This manner of securing the disk is simple and is easily operated, but so far as this feature of my invention is concerned any other means for securing the disk may be employed in lieu of that herein shown.

The straight sides of the angularly formed thread-cutting ribs are preferably formed at a very slight angle to the axis of the disk to increase the width of the ribs at the base, and thereby correspondingly increase their strength.

One face of the disk is provided with a series of marks, see Fig. 1, which are arranged tangential to a small circle concentric to the axis of the disk and said marks serve as gage lines to assist the operator in grinding the wall $a^3$ of the notch of the tool. Any number of marks may be provided. The perimetrical thread-cutting ribs may also have a depth line mark formed on them to assist the operator in determining when the tool has entered the work to the proper depth.

Having thus described my invention, what I claim as new and desire to secure by Letters Patent is:—

1. A screw-tread cutting-tool having two thread-cutting ribs, each having one cutting face only, said ribs being arranged side by side with their cutting faces oppositely disposed, substantially as described.

2. In a screw-thread cutting-tool, a holder, a disk having a center hole and having on its rear side a parallel sided recess, a bushing extending through a hole in the holder and projecting therefrom at each end, one end of said bushing being formed with parallel sides which enters the recess in the disk, and a bolt extending through said disk and bushing having thereon a nut which is adapted to be turned up against the outer end of the bushing, substantially as described.

3. In a screw-thread cutting-tool, a holder, a disk having a center-hole and having on its rear side a parallel sided recess, an adjustable tapered bushing extending through a hole in the holder, the inner end of which projects from the holder and is shaped to correspond to the shape of the recess in the disk, said bushing engaging the disk in any position said disk may occupy relative to its holder, and means for holding the parts assembled, substantially as described.

In testimony whereof, I have signed my name to this specification, in the presence of two subscribing witnesses.

FRANK E. ROSS.

Witnesses:
B. J. NOYES,
H. B. DAVIS.